United States Patent [19]

Cargnel

[11] Patent Number: 4,857,219
[45] Date of Patent: Aug. 15, 1989

[54] LUBRICATING COMPOSITION

[75] Inventor: Louis A. Cargnel, Unity Township, Pa.

[73] Assignee: Westinghouse Electric Corp., Pittsburgh, Pa.

[21] Appl. No.: 191,630

[22] Filed: May 9, 1988

[51] Int. Cl.$^4$ .......................................... C10M 111/02
[52] U.S. Cl. .................................... 252/52 R; 252/79; 585/1; 585/7; 585/25
[58] Field of Search ............... 585/1, 7, 25; 252/52 R, 252/79

[56] References Cited

U.S. PATENT DOCUMENTS

| | | |
|---|---|---|
| 3,360,467 | 12/1967 | McHugh et al. |
| 3,423,469 | 1/1969 | Hatton et al. |
| 3,510,427 | 5/1970 | Worrel |
| 3,567,783 | 3/1971 | Brown .................................... 252/73 |
| 3,636,179 | 1/1972 | Inoue et al. |
| 3,704,277 | 11/1972 | Clark ............................... 252/52 R |
| 3,725,280 | 4/1973 | Durr, Jr. et al. ..................... 585/7 |
| 3,785,974 | 1/1974 | Scott |
| 3,817,721 | 6/1974 | Perilstein ............................... 585/7 |
| 3,860,661 | 1/1975 | Hammann et al. |
| 4,439,015 | 3/1984 | Rich et al. |
| 4,555,352 | 11/1985 | Garner et al. |
| 4,642,730 | 2/1987 | Sato et al. ........................... 585/470 |
| 4,753,745 | 6/1988 | Kostusyk et al. ..................... 585/1 |

FOREIGN PATENT DOCUMENTS

| | | |
|---|---|---|
| 539809 | 4/1957 | Canada |
| 37-13177 | 9/1937 | Japan |
| 59-4692 | 6/1982 | Japan |
| 228215 | 9/1965 | U.S.S.R. |

OTHER PUBLICATIONS

Monsanto "Monsanto Material Safety Data," Mar. 12, 1985 (MSDS Number S00010062).
Monsanto "High Temperature Functional Fluid & Lubricant," Preliminary Technical Data Sheet, Feb. 1, 1960.

*Primary Examiner*—Jacqueline V. Howard
*Attorney, Agent, or Firm*—Joyce L. Morrison

[57] ABSTRACT

A high temperature heat transfer and lubricating composition consisting of a mixture of (a) a mixture of mono-, di- and tribenzylated ethyl benzene and (b) a polyphenyl ether. The lubricant has a pour point of −40° C. and does not degrade at temperatures of 300° C. The lubricant is miscible in all proportions but the ratio of component (a) to component (b) is about 10 to 90:90 to 10.

9 Claims, 1 Drawing Sheet

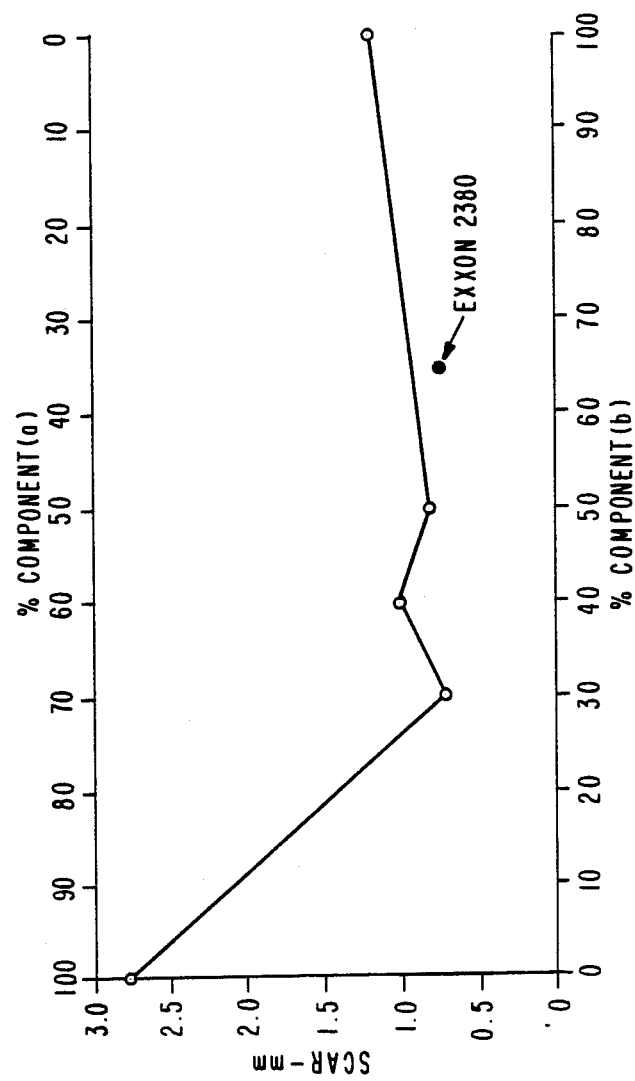

LUBRICATING COMPOSITION

BACKGROUND OF THE INVENTION

1. Field of the Invention

The present invention relates to a cooling and lubricating composition, and more specifically to a composition which is a mixture of (a) a mixture of monobenzylated ethyl benzene, dibenzylated ethyl benzene and tribenzylated ethyl benzene, and (b) a polyphenyl ether.

2. Description of the Prior Art

The use of alkylbenzenes and their derivatives in lubricating oils is well known. See for example, U.S. Pat. Nos. 3,785,974; 4,555,352; 4,642,730; and Japanese Patent No. 37-13177; Canadian Patent No. 539,809 and U.S.S.R. Patent No. 228,215. Alkylbenzenes generally provide coolant properties to lubricants.

Polyphenyl ethers have been used in lubricants for their thermal and oxidative stability. See for example, U.S. Pat. Nos. 3,360,467; 3,423,469; 3,510,427; 3,567,783; 3,704,277; 3,860,661 and 4,555,352; and Japanese Patent Nos. 59-4692 and 37-13177.

Japanese Pat. No. 37-13177 discloses an oil of a copolymer of p-xylylene and one of diphenylether, a, w-diphenylalkylene and/or alkylbenzene.

There is a need for high performance thermal lubricating fluids for use in high speed, high temperature generators. These fluids are required to retain their properties at operating temperatures of about 300° C. and start-up temperatures below 0° C.

In spite of these prior disclosures, there remains a need for a lubricating oil that has thermal stability, viscosity, at high and low temperatures retains good lubricating properties, a low pour point, superior heat transfer properties and good lubrication characteristics for use in high temperature generators and transformers.

SUMMARY OF THE INVENTION

The present invention has met the above-described need by providing a lubricating composition of a mixture of (a) a mixture of monobenzylated ethyl benzene, dibenzylated ethyl benzene and tribenzylated ethyl benzene and (b) a polyphenyl ether. Preferably component (a) and component (b) are present in a weight ratio of about 10 to 90:90 to 10.

It is an object of the present invention to provide a high performance thermal lubricating fluid that does not degrade at temperatures of up to about 300° C.

It is another object of the present invention to provide a lubricating composition of a mixture of (a) a mixture of monobenzylated ethyl benzene, dibenzylated ethyl benzene and tribenzylated ethyl benzene and (b) a polyphenyl ether.

It is a further object of the present invention to provide a lubricating and coolant composition that retains its properties at −40° C.

It is an object of the present invention to provide a method of lubricating and cooling a generator by employing the composition of the present invention.

These and other objects of the present invention will be more fully understood from the following description of the invention and upon reference to the drawing.

BRIEF DESCRIPTION OF THE DRAWING

The FIGURE is an illustration of the average scar diameters of various lubricants.

DETAILED DESCRIPTION OF THE PREFERRED EMBODIMENTS

The coolant and lubricating composition of the present invention is a mixture of (a) a mixture of monobenzylated ethyl benzene, dibenzylated ethyl benzene and tribenzylated ethyl benzene and (b) a polyphenyl ether.

Component (a) is preferably present in a ratio of 60 to 75:18 to 30:2 to 5 of monobenzylated ethyl benzene dibenzylated ethyl benzene:tribenzylated ethyl benzene. More preferably, the ratio of component (a) ingredients is about 74:23:3.

At this preferred ratio component (a) has a boiling range of about 390° to 394° C., a pour point of about −67.8° C. and a viscosity of about 7.2 cps at room temperature. A mixture of mono-, di-, and tribenzylated ethyl benzene is sold by Monsanto Chemical Company under the trade designation Therminol-60.

Component (b) is a polyphenyl ether, and preferably is a mixed isomeric four to six ring polyphenyl ether. The preferred composition of component (b) is a mixture of meta and para isomers of a five ring polyphenyl ether. The precise mixture of isomers may be from about 1 to 99:99 to 1 of para to meta isomers.

Component (b) preferably has a boiling point of about 982° F. and a viscosity of 1980 cps. at room temperature and has superior lubricating qualities. A preferred polyphenyl ether is sold by Monsanto Chemical Company under the trade designation OS-124.

Mixtures of component (a) and component (b) are miscible at all ranges. However, it is preferred that the weight ratio of component (a) to component (b) be about 10 to 90:90 to 10, and more preferably about 50 to 70:50 to 30. At this most preferred range, the room temperature viscosity is about 18.3 to 38.5 cps. The mixture has a pour point of about −40° C. in this range. This viscosity and pour point provides ideal lubricity and coolant properties in this range. The mixture has better lubrication properties than either fluid alone.

The wear prevention characteristics of the fluid mixtures were determined with a Precision Shell Four Ball Wear Tester according to ASTM D2266. The test was run for thirty (30) minutes at 1800 RPM with a 52 Kg load. Average scar diameters are plotted in the FIGURE. Comparative test results using Exxon 2380, a product of Exxon Chemical Company, are shown. Exxon 2380 is a polyol ester based lubricant.

All three fluid mixtures yielded scar diameters less than those of neat OS-124 (component (b)) and one third the size of the scar produced by T-60 (component (a). The data shown in the figure also indicate that the fluid mixtures will have lubricity similar to the standard lubricant Exxon 2380. The lubricity of the mixed fluids shows a strong synergistic action in that addition of relatively small amounts of component (b) to component (a) causes a strong improvement in the lubricity, even beyond that of neat component (b).

The pour points of a range of mixtures of component (a) and component (b) are shown in Table I. The pour points of component (a), component (b) and Exxon 2380 are shown for comparison.

TABLE I

| Product | Pour Points |
| --- | --- |
| Exxon 2380 | −45° C. |
| 100% component (a) | −90° F. |
| 100% component (b) | 40° F. |
| 50% component (b) | −25° C. (−4° F.) |

TABLE I-continued

| Product | Pour Points |
|---|---|
| 50% component (a) | R.T. Visc. = 38.5 cps |
| 40% component (b) | −32° C. (−26° F.) |
| 60% component (a) | R.T. Visc. = 25.9 cps |
| 30% component (b) | −40° C. (−40° F.) |
| 70% component (a) | R.T. Visc. = 18.3 cps |
| 50% component (b) | −25° C. (−4° F.) |
| 50% component (a) | Visc. = 43.3 cps.* |

*after 100 hours at 300° C.

It can be seen that a wide range of mixtures of component (a) and component (b) provide sub-zero pour points and good viscosity.

The present invention discloses a coolant and lubricant composition which is a mixture of (a) a mixture of monobenzylated ethyl benzene, dibenzylated ethyl benzene and tribenzylated ethyl benzene and (b) a polyphenyl ether. This composition has good cooling and lubricating properties and has a low pour point and has thermal stabilizers at temperatures of about 300° C.

Whereas particular embodiments of the invention have been described above for purposes of illustration, it will be appreciated by those skilled in the art that numerous variations of the details may be made without departing from the invention as described in the appended claims.

I claim:

1. A composition suitable for use as a high temperature coolant and lubricant comprising a mixture of:
   (a) a mixture of monobenzylated ethyl benzene dibenzylated ethyl benzene and tribenzylated ethyl benzene; and
   (b) a polyphenyl ether.

2. The composition of claim 1 wherein component (a) and component (b) are present in a weight ratio of about 10 to 90 percent component (a) to 90 to 10 percent component (b).

3. The composition of claim 2 wherein said component (a) is a mixture of about 60 to 75 monobenzylated ethyl benzene; about 18 to 30 percent dibenzyolated ethyl benzene and about 2 to 5 percent tribenzylated ethyl benzene.

4. The composition of claim 3 wherein said component (a) is a mixture of about 74 percent monobenzylated ethyl benzene; about 23 percent dibenzylated ethyl benzene and about 3 percent tribenzylated ethyl benzene.

5. The composition of claim 3 wherein component (b) is a mixed isomeric four to six ring polyphenyl ether.

6. The composition of claim 5 wherein said polyphenyl ether is a five ring polyphenyl ether.

7. The composition of claim 6 wherein said polyphenyl ether is a mixture of meta and para isomers.

8. The composition of claim 5 wherein component (a) and component (b) are present in a weight ratio of about 50 to 70 percent component (a) and 50 to 30 percent component (b).

9. A method of lubricating and cooling a generator comprising employing the lubricating composition of claim 1 in said generator.

* * * * *